United States Patent
Tscharner

(10) Patent No.: US 6,691,479 B1
(45) Date of Patent: Feb. 17, 2004

(54) PROTECTIVE STAKE COVER FOR MOUNTING ON TOP OF A METAL STAKE

(76) Inventor: Eric Tscharner, 3027 S. Grant St., Englewood, CO (US) 80110

( * ) Notice: Subject to any disclaimer, the term of this patent is extended or adjusted under 35 U.S.C. 154(b) by 97 days.

(21) Appl. No.: 10/128,046

(22) Filed: Apr. 24, 2002

(51) Int. Cl.[7] ................................................. E04H 12/00
(52) U.S. Cl. ........................... 52/301; 135/118; 16/421; 74/543; 405/255
(58) Field of Search ............................... 52/301, 3, 155; 135/118; 5/281; 174/158 F, 156, 161 F; 16/421; 74/543, 144, 156, 162; 405/255

(56) References Cited

U.S. PATENT DOCUMENTS

| | | | |
|---|---|---|---|
| 574,755 A | * | 1/1897 | Oehler |
| 1,202,178 A | * | 10/1916 | Gale |
| 3,419,270 A | * | 12/1968 | Eppy |
| 3,866,034 A | * | 2/1975 | Russo |
| 3,915,434 A | * | 10/1975 | Lister |
| 4,361,314 A | * | 11/1982 | Ohlson |
| 4,520,231 A | * | 5/1985 | Hubbell |
| 4,623,756 A | * | 11/1986 | Wilson |
| 4,680,428 A | * | 7/1987 | Wilson |
| 4,852,299 A | * | 8/1989 | Smoak et al. |
| 4,872,666 A | * | 10/1989 | Smith |
| 4,922,652 A | * | 5/1990 | Graves |
| 5,299,883 A | * | 4/1994 | Arth |
| 5,305,660 A | * | 4/1994 | Hasegawa |
| 5,487,618 A | * | 1/1996 | Cox |
| 5,513,466 A | * | 5/1996 | Mercier |
| 5,731,895 A | * | 3/1998 | Owczarzak et al. |
| 6,076,807 A | * | 6/2000 | Spence |
| 6,185,786 B1 | * | 2/2001 | Garcia |
| 6,209,276 B1 | * | 4/2001 | Venegas |
| 6,257,557 B1 | * | 7/2001 | Anderson et al. |
| 6,527,255 B2 | * | 3/2003 | O'Berry et al. |
| 6,543,750 B1 | * | 4/2003 | Calzone |

* cited by examiner

*Primary Examiner*—Robert Canfield
(74) *Attorney, Agent, or Firm*—Edwin H. Crabtree; Ramon L. Pizarro; Donald W. Margolis

(57) ABSTRACT

A protective stake cover for covering the top of a metal stake. The stake cover is designed to prevent injury should someone fall and accidentally hit the top of the cover when working or playing near the stake. The stake cover includes an elongated split housing having a first housing half releasably attached to a second housing half. The split housing is adapted for receipt around an upper portion of a metal stake having a "T" shaped cross section. The split housing, when the first and second half are joined together, includes an exterior with a rounded top portion, a center portion and a lower portion. The lower portion has a groove therearound for receiving one end of a rope used in holding a tree, bush, plant or other item in an upright position. The inside of the first and second housing halves include an elongated channel with an "L" shaped cross section contoured for receiving one half of the upper portion of the metal stake. Along the length of the "L" channel are a plurality of rib cavities for receiving ribs. The ribs are spaced along a length of the top portion of the metal stake. Also, the inside of the first and second halves include a stake top cavity for receiving a top of the metal stake therein.

15 Claims, 1 Drawing Sheet

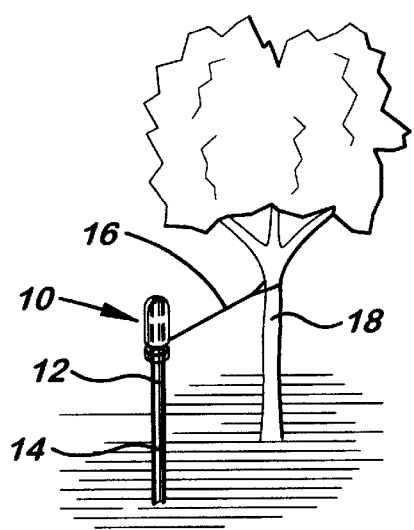
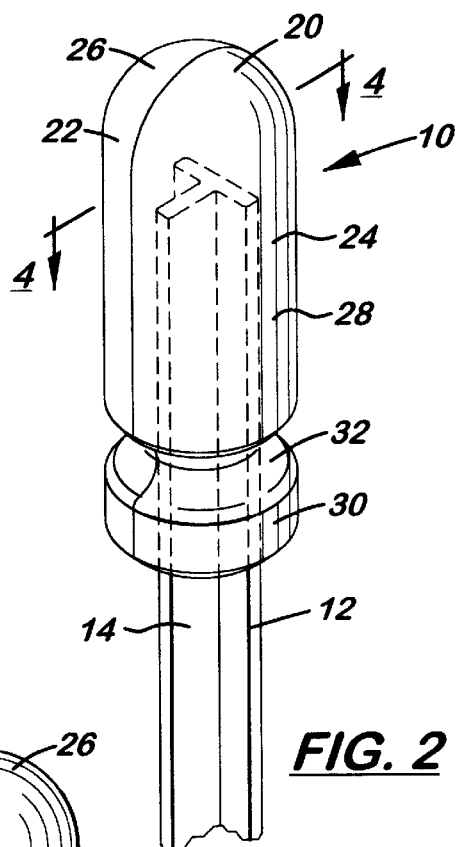
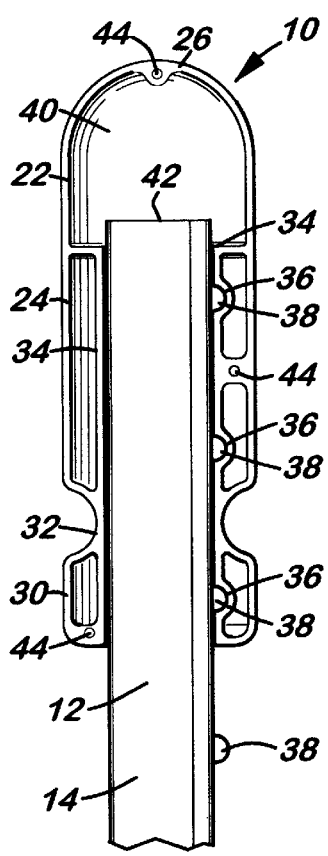
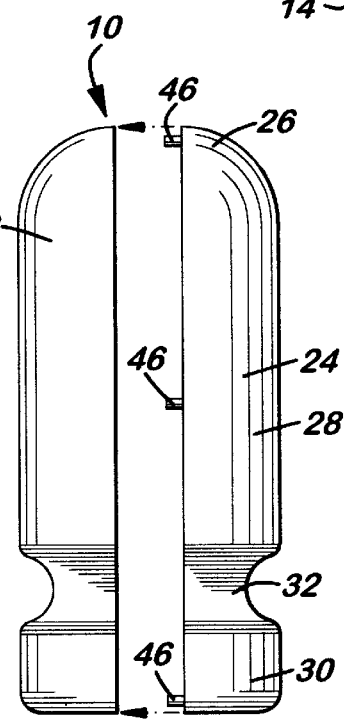
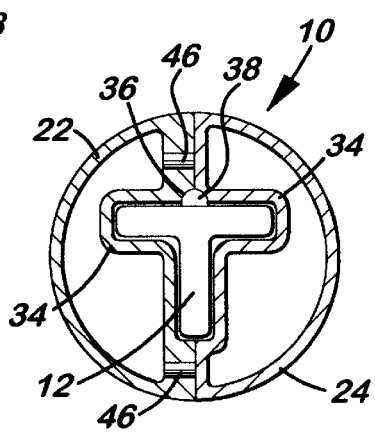
FIG. 1
FIG. 2
FIG. 3
FIG. 5
FIG. 4

PROTECTIVE STAKE COVER FOR MOUNTING ON TOP OF A METAL STAKE

BACKGROUND OF THE INVENTION (a) Field of the Invention

This invention relates to a stake cover for covering the top of a tree stake, post stake and the like and more particularly, but not by way of limitation, to a plastic protective stake cover which can be quickly mounted over the top of a metal stake.

(b) Discussion of Prior Art

Heretofore, there have been a variety of different types of covers for attaching and mounting on stakes used with trees, plants, tents, fences and the like. In U.S. Pat. Nos. 5,197,506 to Morin and 3,814,118 to Larson, two different types of tent stake covers or guards are disclosed to prevent injury to persons walking around a tent. In U.S. Pat. No. 5,987,845 to Laronde, a tongue and grove post cover is described. In U.S. Pat. Nos. 5,419,536 to Bender and 6,076,807 to Spence, fence or deck post caps are illustrated for mounting on top of a post. In U.S. Pat. No. 5,829,913 to Puckett, a bollard cap or safety post cap is illustrated for mounting on top of a pipe section. Also, in U.S. Pat. No. 6,330,998 to Roy, an extruded plastic sheath is disclosed for covering the length of a steel T-post. The sheath includes an external spine with studs for attaching fence wire thereon.

None of the above mentioned prior art patents specifically disclose the unique features, structure and function of the subject plastic protective stake cover used for mounting on the top of a metal stake.

SUMMARY OF THE INVENTION

In view of the foregoing, it is a primary objective of the subject invention to cover the top of a metal stake and prevent injury should someone fall and hit the top of the protective stake cover when working or playing near the stake.

Another object of the invention is the stake cover includes a split housing which can be quickly attached to the top of a standard metal stake having a "T" shaped cross section. Also and if necessary, the stake cover can be adapted for attaching to the top of other types of stakes.

Yet another object of the invention is the stake cover is make of hard plastic for extended life, the cover is inexpensive and roughed in construction and it can be reused when a stake is removed.

The protective stake cover includes an elongated split housing having a first housing half releasably attached to a second housing half. The split housing is adapted for receipt around an upper portion of a metal stake having a "T" shaped cross section. The split housing, when the first and second half are joined together, includes an exterior with a rounded top portion, a center portion and a lower portion. The lower portion has a groove therearound for receiving one end of a rope used in holding a tree, bush, plant or other item in an upright position. The inside of the first and second housing halves include an elongated channel with an "L" shaped cross section contoured for receiving one half of the upper portion of the metal stake. Along the length of the "L" channel are a plurality of rib cavities for receiving ribs. The ribs are spaced along a length of the top portion of the metal stake. Also, the inside of the first and second halves include a stake top cavity for receiving a top of the metal stake therein.

These and other objects of the present invention will become apparent to those familiar with various types of stake covers when reviewing the following detailed description, showing novel construction, combination, and elements as herein described, and more particularly defined by the claims, it being understood that changes in the embodiments of the disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 illustrates a perspective view of the subject protective stake cover attached to one end of a rope. The other end of the rope is attached to a portion of a small tree for holding the tree upright.

FIG. 2 is an enlarged perspective view of the stake cover illustrating a split housing with a first housing half and a second housing half received around a top portion of a metal stake having a "T" shaped cross section.

FIG. 3 is a front view of the inside of the first housing half received around one half of the top portion of the metal stake.

FIG. 4 is a cross sectional view of the first and second housing halves taken along lines 4—4 shown in FIG. 2.

FIG. 5 is a side view of the first and second housing halves positioned for attachment to each other.

DETAILED DESCRIPTION OF THE PREFERRED EMBODIMENTS

In FIG. 1, a perspective view of the subject plastic protective stake cover is illustrated and having a general reference numeral 10. The stake cover 10 is shown received around an upper portion 12 of a metal stake 14. The metal stake 14 has a "T" shaped cross section as shown in FIGS. 2 and 4. The stake cover 10 in this drawing is shown attached to one end of a rope 16. The other end of the rope 16 is attached to a portion of a small tree 18 for holding the tree upright. While the tree 18 is shown in this drawing, it can be appreciated that the stake cover 10 and the metal stake 14 can be used in a variety of application for holding an item upright.

In FIG. 2, an enlarged perspective view of the stake cover 10 is shown having a split housing 20 with a first housing half 22 and a second housing half 24 received around the top portion 12 of the metal stake 14. The exterior of the split housing 20 includes a rounded top portion 26, a center portion 28 and a lower portion 30. The rounded top portion 26 provides protection against injury should someone accidentally fall on top of the stake cover 10. The lower portion 30 includes a groove 32 therearound. The groove 32 is used for receiving the one end of the rope 16 for holding various items when using the subject stake cover 10.

In FIG. 3, a front view of the inside of the first housing half 22 is shown received around one half of the upper portion 12 of the metal stake 14. The inside of the first and second housing halves 22 and 24 include an elongated channel 34 having an "L" shaped cross section and contoured for receiving opposites halves of the upper portion 12 of the "T" shaped cross section of the metal stake 14. Along the length of the two elongated channels 34 are a plurality of rib cavities 36 adapted for receiving ribs 38. The ribs 38 are spaced along a length of the metal stake 14. Also, the inside of the first and second halves 22 and 24 include a stake top cavity 40 for receiving a top 42 of the metal stake 16 therein. It should be note that when driving the metal stake 16 into a ground surface, quite often the top 42 becomes misshaped and enlarged, therefore the stake top cavity 40 is designed to be sufficient in size for receiving the top 42.

While the channels 34 are shown having an "L" shaped cross section, it can be appreciated that the channels 34 can have other contoured configurations for receiving a top portion of different types, sizes and cross sections of stakes therein without departing from the spirit and scope of the invention as described.

The inside of the first housing half 22 also include a plurality of stud holes 44 formed therein. The stud holes 44 are indexed for receiving a plurality of outwardly extending studs 46 in the side of the second housing half 24, as shown in FIG. 5.

In FIG. 4, a cross sectional view of the first and second housing halves 22 and 24 is shown taken along lines 4—4 in FIG. 2. In this drawing, an end view of the "L" shaped cross section of the channels 34 can be seen with opposite halves of the "T" shaped cross section of the metal stake 12 received therein. Also, one of the ribs 38 of the metal stake 12 is shown received in the rib cavity 36.

In FIG. 5, a side view of the first housing half 22 is shown positioned for receiving the studs 46 of the second housing half 24 in the stud holes 44 and securing the two halves together to form the split housing 20. The metal stake 12 is not shown in this drawing.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A protective stake cover for mounting around a top portion of a metal stake, the metal stake having a "T" shaped cross section, the stake cover comprising:

an elongated split housing, said split housing having a first housing half and a second housing half, an inside of said first and second housing halves having a channel of L-shaped cross section along the length thereof and adapted for receiving a portion of the top portion of the metal stake.

2. The stake cover as described in claim 1 wherein said first and second housing halves include a stake top cavity adapted for receiving the tog of the metal stake therein.

3. The stake cover as described in claim 1 wherein said first and second housing halves include a plurality of rib cavities disposed next to said channels and adapted for receiving ribs disposed along a length of the metal stake.

4. The stake cover as described in claim 1 wherein said first housing half includes a plurality of stud holes and said second housing half includes a plurality of studs, whereby when said first housing half is attached to said second housing half, said studs are indexed with said stud holes and received therein.

5. The stake cover as described in claim 1 wherein an exterior of said split housing includes a rounded top portion, a center portion and a lower portion.

6. The stake cover as described in claim 5 wherein the lower portion of said split housing includes a groove therearound, the groove adapted for receiving one end of a rope or cord for holding an item upright.

7. A protective stake cover for mounting around a top portion of a metal stake, the stake cover comprising:

an elongated split housing, said split housing having a first housing half and a second housing half, an inside of said first and second housing halves having a channel of L-shaped cross section along the length thereof and adapted for receiving a top portion of the metal stake, said split housing having an exterior with a rounded top portion, a center portion and a lower portion.

8. The stake cover as described in claim 7 wherein the lower portion of said split housing includes a groove therearound, the groove adapted for receiving one end of a rope or cord for holding an item upright.

9. The stake cover as described in claim 7 wherein said first and second housing halves include a stake top cavity adapted for receiving the top of the metal stake therein.

10. The stake cover as described in claim 7 wherein said first and second housing halves include a plurality of rib cavities disposed next to said channels and adapted for receiving ribs disposed along a length of the metal stake.

11. The stake cover as described in claim 7 wherein said first housing half includes a plurality of stud holes and said second housing half includes a plurality of studs, whereby when said first housing half is attached to said second housing half, said studs are indexed with said stud holes and received therein.

12. A protective stake cover for mounting around a top portion of a metal stake, the metal stake having a "T" shaped cross section, the stake cover comprising:

an elongated split housing, said split housing having a first housing half and a second housing half, an inside of said first and second housing halves having a channel along the length thereof and adapted for receiving a top portion of the metal stake, said channels having a "L" shaped cross section for receiving one half of the top portion of the metal stake therein, an exterior of said split housing having a rounded top portion, a center portion and a lower portion with a groove therearound.

13. The stake cover as described in claim 12 wherein said first and second housing halves include a stake top cavity in an upper portion thereof, said stake top cavity adapted for receiving the top of the metal stake therein.

14. The stake cover as described in claim 12 wherein said first and second housing halves include a plurality of rib cavities equally spaced next to said channels, said rib cavities adapted for receiving ribs therein, the ribs disposed along a length of the metal stake.

15. The stake cover as described in claim 12 wherein said first housing half includes a plurality of stud holes and said second housing half includes a plurality of studs, whereby when said first housing half is attached to said second housing half, said studs are indexed with said stud holes and received therein.

* * * * *